United States Patent Office 2,816,011
Patented Dec. 10, 1957

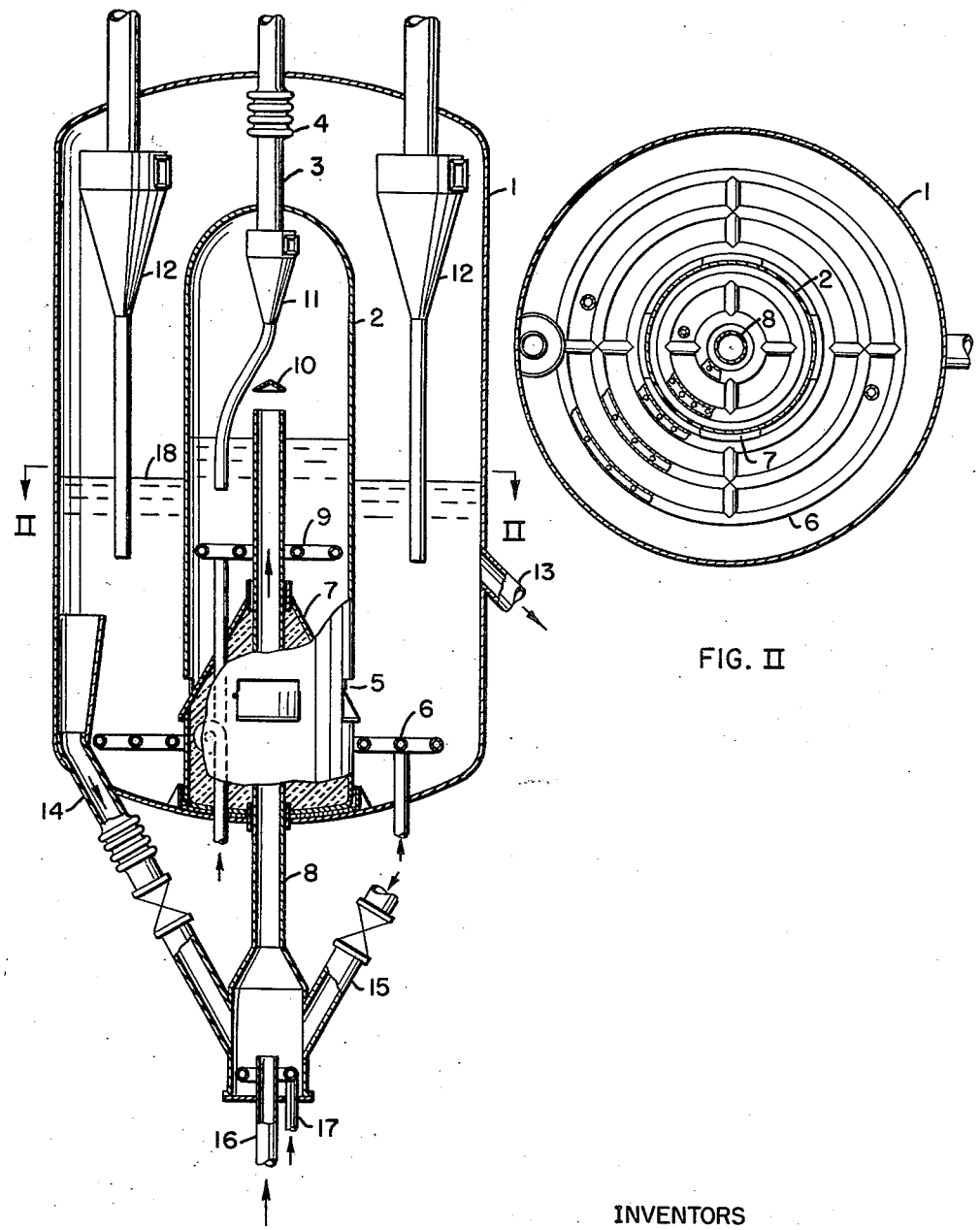

2,816,011

FLUID CATALYST REGENERATION VESSEL

Richard P. Trainer, Babylon, N. Y., and Frederick Kunreuther, Houston, Tex., assignors to Shell Development Company, New York, N. Y., a corporation of Delaware Application November 22, 1954, Serial No. 470,294

3 Claims. (Cl. 23—288)

This invention relates to improved catalyst regeneration.

In the catalytic conversion of hydrocarbons and other carbonaceous materials at elevated temperatures, the catalyst becomes deactivated through the deposition thereon of carbon deposits often referred to as coke. It is common practice to reactivate the thus contaminated catalyst by burning off the carbonaceous deposits and this operation is commonly called regeneration of the catalyst. In such cases where the rate of contamination of the catalyst is sufficiently high that frequent regeneration is required, it is most advantageous to effect the regeneration in a separate vessel called the regenerator, and to continuously cycle the catalyst therethrough using the so-called fluid catalyst technique. In such processes the finely divided catalyst passing from the reaction vessel to the regeneration vessel tends to carry with it in occluded and adsorbed form a considerable amount of the reactant and/or reaction products. The transfer of this material from the reactor to the regenerator not only results in waste of valuable material, but also considerably complicates the regeneration. It is therefore the practice to remove as much of such occluded and adsorbed material from the catalyst as practical before introducing the catalyst into the regenerator. This is normally done in a so-called stripping step wherein the catalyst is stripped with a suitable gas, such as steam. The vessel or zone in which the stripping is carried out is known as the stripping vessel or zone. The stripping is usually carried out in a more or less segregated or isolated zone within the reaction vessel. However, in some cases, a separate stripping vessel is used. It has also been proposed to effect the stripping in a segregated or isolated zone within the regeneration vessel. While this is possible, it involves various additional problems the solutions to which have not been satisfactorily solved heretofore. Consequently, as far as we are aware, this arrangement has never been applied in commercial operation.

An object of the invention is to provide a new improved regenerator design wherein the stripping is effected within the regeneration vessel and in such a manner that the regeneration load and regenerator cooling requirements are reduced. It is more particularly an object of the invention to provide a new, improved, and practical regenerator arrangement wherein the fullest advantage of high temperature dispersed phase stripping can be achieved without the necessity of additional compression of process gas. These and related objects which will be apparent from the description are realized in the regenerator apparatus illustrated in the accompanying drawings and now to be described.

Figure I of the drawing is a semi-diagrammatic elevational view in section of one form of the apparatus. Figure II is a sectional plan view taken through the plane II—II of Figure I.

Referring to the figures wherein like parts are designated with like reference numbers, the apparatus comprises a single vertically disposed cylindrical regeneration vessel 1 having suitable top and bottom closures. For most uses, and particularly for use in the catalytic cracking of hydrocarbon oils, this vessel may be quite large, e. g., up to forty feet diameter.

Within the regeneration vessel is a stripping compartment which is wholly enclosed within the vessel and entirely isolated from the remaining space in the vessel except for suitable ports for the flow of pseudo liquid catalyst from the stripping compartment into the remaining space. In the apparatus illustrated in Figure I this stripping compartment is formed by an axially placed cylinder 2 which is sealed at the bottom and closed at the top, except for the vapor exit line 3 containing expansion joint 4 which passes out through the top closure of vessel 1. The stripping zone is within this inner cylinder 2 and is therefore entirely isolated from the remaining space in the vessel except for the suitable ports 5 which in the case illustrated, are near the bottom just above the air distributor 6. These ports are arranged to allow passage of catalyst from the lower part of the inner cylinder to the lower part of the annular space near the air distributor 6 by gravity flow. In the arrangement illustrated, ports 5 are four rectangular openings in the cylinder 2.

In order to ensure gravity flow through the ports and to prevent the catalyst from packing in the lower part of cylinder 2, the cylinder is preferably provided with a conical false bottom 7 which slopes at an angle greater than the angle of repose of the catalyst, e. g. at 30° from the vertical. This conical bottom has at its top a loose fit with the inner line 8 to allow for vertical movement due to expansion and contraction. Also, the lower edge of the cone 7 is preferably passed through the openings 5 a short distance to form a lip or short chute which prevents gas introduced by the distributor 6 from passing through the ports 5. The space below the bottom of the cylinder and the cone 7, i. e. under the cone, may be filled with an inert refractory material such as foraminous insulating cement, i. e. Tuff-lite, or the like.

A vertical riser line 8 passes through the bottom closure of the regeneration vessel up into the inner cylinder. It is important that this line, open at the top, extend from a point several feet below the bottom closure of the vessel to a point within the inner cylinder which is above the highest catalyst bed level to be held in the vessel during operation. A steam injection ring 9 is located within the inner cylinder near the bottom for the introduction of stripping gas, e. g., steam, into the stripping zone. A deflecting cap 10 is preferably placed somewhat above the top of the riser line 8 to deflect the upwardly flowing catalyst discharged through the top of the riser. A cyclone separator 11 is also preferably provided within the inner cylinder near the top, i. e., within the disengaging space above the fluidized bed, to remove suspended catalyst particles from the stripping vapors which are withdrawn via line 3.

The regenerator is provided with a perforated pipe distributor 6 near the bottom to supply the air required for burning the carbonaceous deposits from the catalyst. Also, conventional cyclone separators 12 are provided in the upper or disengaging section of the vessel above the level of the fluidized catalyst bed. A catalyst withdrawal line 13 is provided and positioned such that regenerated catalyst may be withdrawn by gravity flow from the fluidized bed of catalyst in the regeneration vessel. In addition to this catalyst withdrawal line, a second catalyst withdrawal line 14 is provided. This downwardly sloping line 14, which in fact functions as a short standpipe, is connected at its lower end with the lower end of the riser line 8. A second line 15 for the introduction of spent catalyst to be regenerated also connects to the bottom of the riser line 8. A suitable steam inlet line 16 projects into the bottom of the riser 8 near the junction with lines 14 and 15. Thus, the riser line 8 extends below the bottom of the vessel 1 to a point where it is joined to two separate catalyst inlet lines and a steam injection line. A secondary gas inlet line 17 for the introduction of controlled amounts of air may also advantageously be provided at this junction point.

In operation of the regenerator, a catalyst bed level 18 is maintained by control of the rate of catalyst withdrawal via line 13. The temperature in the annular regeneration section is maintained between about 1050 and 1250° F. either by control of the catalyst circulation rate or by any suitable conventional cooling means (not shown). Spent catalyst to be regenerated flows by gravity down line 15 at a controlled rate. Regenerated catalyst withdrawn from the fluidized bed in the regeneration section is passed by line 14 at a rate controlled by a suitable valve in this line. The two catalyst streams meet at the bottom of the riser 8 where they are immediately dispersed in steam introduced via line 16. The resulting dilute suspension is carried up through the riser line 8 into the stripping cylinder 2 being discharged above the level of the catalyst bed therein. The steam and stripped vapors pass up through the cyclone separator 11 and out by line 3. The catalyst falls and collects as a fluidized bed in the lower part of the inner cylinder. This catalyst then flows downwardly through the force of its greater hydrostatic head and passes through the ports 5 and to the fluidized bed surrounding cylinder 2.

In this operation, the spent catalyst is stripped while flowing concurrently as a dilute suspension in the stripping steam and while simultaneously being heated by the sensible heat of the regenerated catalyst with which it is mixed. The stripped vapors are immediately separated and removed with minimum opportunity to be reoccluded and cracked in the denser catalyst bed where the stripping is completed by the steam or other stripping gas introduced through the distributor 9. The described circulation of regenerated catalyst through the stripping zone is effected without separate lifting means, since such lifting as is required to ensure circulation is effected with the stripping steam.

It will be apparent that the described apparatus may be modified in some particulars while still obtaining the advantages of the new mode of operation. For example, the stripping cylinder 2 does not need to be axially placed in the vessel. Also, the ports 5 may be differently constructed. The cylinder 2 may, if desired, be suspended from the top of the vessel rather than rested on the bottom closure. This latter modification, although somewhat more difficult from the engineering standpoint, allows elimination of the expansion joint 4.

We claim as our invention:

1. A fluid catalyst regeneration apparatus with internal stripping arrangement comprising a regeneration vessel having top and bottom closures, air distributing means near the bottom, and conduit means for withdrawal of flue gas near the top; a standpipe adapted for the withdrawal of regenerated catalyst from said apparatus, said standpipe being connected to said regeneration vessel; a vertically mounted chamber within said vessel and completely sealed from the remaining space in said vessel, a catalyst outlet port near the bottom, conduit means at the top of said chamber adapted for the withdrawal of stripping steam from the top of said chamber, a vertical riser line, open at the top and extending from a point below said vessel up through the bottom closure thereof and debouching within said chamber above the highest level of fluidized catalyst therein, a second standpipe arranged and adapted to discharge spent catalyst from an outside source into said riser line by gravity flow; a third and separate standpipe arranged and adapted to discharge catalyst from said regeneration vessel by gravity flow into said riser line, a steam line connected at the bottom of said riser line below the points of the introduction of the two streams of catalyst from said latter two standpipes, said steam line being arranged and adapted to disperse catalyst introduced by said two standpipes and transport the resulting dispersion up through said riser to the upper space within said chamber above the level of fluidized catalyst therein.

2. Apparatus according to claim 1 further characterized in that said outlet port near the bottom of said chamber consists of a series of openings spaced around the circumference of said chamber immediately above a false bottom of conical shape with said riser line passing through the apex of the cone.

3. Apparatus according to claim 1 further characterized in that said outlet port is immediately above said air distributing means.

References Cited in the file of this patent
UNITED STATES PATENTS

| | | |
|---|---|---|
| 2,451,619 | Hengstebeck et al. | Oct. 19, 1948 |
| 2,475,650 | Thompson et al. | July 12, 1949 |
| 2,514,288 | Nicholson | July 4, 1950 |
| 2,543,884 | Weikart | Mar. 6, 1951 |
| 2,581,670 | Kassel | Jan. 8, 1952 |
| 2,604,384 | Border et al. | July 22, 1952 |
| 2,608,473 | Stephens | Aug. 26, 1952 |
| 2,618,535 | Trainer et al. | Nov. 18, 1952 |
| 2,628,158 | Wilcox et al. | Feb. 10, 1953 |
| 2,631,927 | Trainer et al. | Mar. 17, 1953 |
| 2,698,281 | Leffer | Dec. 28, 1954 |